(12) United States Patent
van Oort et al.

(10) Patent No.: US 9,920,608 B2
(45) Date of Patent: Mar. 20, 2018

(54) METHOD OF IMPROVING HYDRAULIC FRACTURING BY DECREASING FORMATION TEMPERATURE

(71) Applicant: Board of Regents, The University of Texas System, Austin, TX (US)

(72) Inventors: Eric van Oort, Austin, TX (US); Tadeusz W. Patzek, Austin, TX (US); Saeid Enayatpour, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 50 days.

(21) Appl. No.: 13/965,756

(22) Filed: Aug. 13, 2013

(65) Prior Publication Data

US 2015/0047846 A1 Feb. 19, 2015

(51) Int. Cl.
*C09K 8/592* (2006.01)
*E21B 43/26* (2006.01)
*E21B 36/00* (2006.01)
*E21B 43/16* (2006.01)
*C09K 8/62* (2006.01)

(52) U.S. Cl.
CPC ........... *E21B 43/26* (2013.01); *C09K 8/62* (2013.01); *E21B 36/001* (2013.01); *E21B 43/164* (2013.01)

(58) Field of Classification Search
CPC C09K 8/592; C09K 5/16; E21B 43/17; E21B 43/20
USPC ........................................................ 166/302
See application file for complete search history.

(56) References Cited

U.S. PATENT DOCUMENTS

| | | | |
|---|---|---|---|
| 5,255,740 A | 10/1993 | Talley | |
| 5,591,700 A | 1/1997 | Harris et al. | |
| 5,964,290 A | 10/1999 | Riese et al. | |
| 8,448,708 B2 | 5/2013 | Kosakewich | |
| 8,453,738 B2 | 6/2013 | Martinez | |
| 2002/0039972 A1 | 4/2002 | Allan et al. | |
| 2007/0221377 A1* | 9/2007 | Vinegar | C10G 9/24 166/272.6 |
| 2007/0234788 A1 | 10/2007 | Glasbergen et al. | |
| 2010/0263874 A1 | 10/2010 | Kosakewich | |
| 2011/0028357 A1* | 2/2011 | Abad | C09K 8/03 507/219 |
| 2011/0162847 A1* | 7/2011 | Martinez | E21B 36/001 166/302 |
| 2013/0037270 A1 | 2/2013 | DiFoggio | |
| 2013/0105179 A1 | 5/2013 | Lieberman | |

FOREIGN PATENT DOCUMENTS

| | | |
|---|---|---|
| WO | 0242603 | 5/2002 |
| WO | 2005080748 | 9/2005 |

OTHER PUBLICATIONS

Bahr, HA et al.; "Scaling behavior of thermal shock crack patterns and tunneling cracks driven by cooling or drying" Journal of the Mechanics and Physics of Solids, 58:1411-1421, 2010.
Bahr, HA et al.; "Thermal-shock crack patterns explained by single and multiple crack propagation," Journal of Materials Science, 21:2716-2720, 1986.
Carslaw, HS and Jaeger, JS; "Conduction of Heat in Solids," Oxford University Press, USA; 2nd edition (Apr. 10, 1986), 58-59.
Cengel, YA; "Thermodynamics: An Engineering Approach," McGraw-Hill., 4th edition (2002), 95.
Enayatpour, "Thermal Stimulation Enhances the Hydraulic Fracturing Process," Oral presentation for SPE Student Presentation Contest (Jan. 25, 2013).
Griffith, AA; "The phenomena of rupture and flow in solids," Philosophical Transactions of the Royal Society of London, 221:163-198, 1921.
Incropera, F et al.; "Introduction to Heat Transfer," Wiley, 2nd edition (1990), 259-260, Figure 5.17.
Inglis, CE; "Stresses in a plate due to the presence of cracks and sharp corners," Spring Meetings of the Fifty-fourth Session of the Institution of Naval Architects, pp. 219-241, 1913.
Lau, CC et al.; "Production technology challenges of tight and shale gas production in China," International Petroleum Technology Conference, 2013. IPTC 17096.
Meredith, P; "Permeability Variations During Crack Damage Evolution in Rocks," Oral Presentation for Euroconference (Sep. 2007).
Ritchie, RH and Sakakura, AY; "Asymptotic expansions of the heat conduction equation in internally bounded cylindrical geometry," Journal of Applied Physics, 27:1453-1459, 1956.
Sandler, SI; "Chemical, Biochemical, and Engineering Thermodynamics," John Wiley and Sons, Inc., 4th edition (2006), 243.
Schultz, R; "Growth of geologic fractures into large-strain populations: Review of nomenclature, subcritical crack growth, and some implications for rock engineering," International Journal of Rock Mechanics and Mining Sciences, 37(1-2): 403-411, 2000.
Stephens, G and Voight, B; "Hydraulic Fracturing Theory for Conditions of Thermal Stress," International Journal of Rock Mechanics and Mining Sciences & Geomechanics Abstracts, 19:279-284, 1982.
Intellecutal Ventures, Unconventional Gas Extraction Technology, US-812508, Supercritical argon shale fracturing, 2013.

(Continued)

*Primary Examiner* — William D Hutton, Jr.
*Assistant Examiner* — Ashish K Varma
(74) *Attorney, Agent, or Firm* — Meunier Carlin & Curfman LLC

(57) ABSTRACT

A method for producing fractures in a formation to release hydrocarbons (such as a hydrocarbon gas or liquid) from the formation is disclosed. The method comprises reducing the in-situ temperature at a location in a formation having a first temperature by contacting the location with a first fluid and contacting the location with a fracturing fluid to produce fractures in the formation while the location is at a second temperature below the first temperature to release hydrocarbons from the formation. The method can include using an endothermic process to reduce the temperature at the location in the formation.

16 Claims, No Drawings

(56) References Cited

OTHER PUBLICATIONS

Izadi et al., "The effects of thermal stress and fluid pressure on induced seismicity during stimulation to production within fractured reservoirs," Terra Nova, 2013, vol. 25, No. 5, p. 374-380.
Keaney et al., "Thermal damage and the evolution of crack connectivity and permeability in ultra-low permeability rocks," American Rock Mechanics Association, 2004, ARMA/NARMS 04-537.
Kim et al., "Effect of thermal shock and rapid unloading on mechanical rock properties," American Rock mechanics Association, 2009, ARMA 09-84.
Lan et al., "Evolution of in situ rock mass damage induced by mechanical-thermal loading," Rock Mechanics and Rock Engineering, 2013, vol. 46, p. 153-168.
Shen et al., "Multi-region boundary element analysis for coupled thermal-fracturing processes in geomaterials," Rock Mechanics and Rock Engineering, 2013, vol. 26, p. 135-151.
Vargas et. al., "On the effect of thermally induced stresses in failures of some rock slopes in Rio de Janeiro, Brazil," Rock Mechanics and Rock Engineering, 2013, vol. 46, p. 123-134.
Yin, "Numerical Analysis of thermal fracturing in subsurface cold water injection by finite element methods," International Journal for Numerical and Analytical Methods in Geomechanics, 2013, vol. 37, p. 2523-2538.
International Search Report and Written Opinion dated May 19, 2015, in corresponding International Application No. PCT/US2014/050833.

\* cited by examiner

METHOD OF IMPROVING HYDRAULIC FRACTURING BY DECREASING FORMATION TEMPERATURE

FIELD OF THE INVENTION

This invention relates to a method for enhancing the efficiency of recovery of liquid and gaseous hydrocarbons from oil and gas wells. In particular, the invention relates to methods for reducing the temperature of a subsurface formation to facilitate or improve the flow of hydrocarbon fluids from hydraulic fractures in the formation into a well.

BACKGROUND

Hydraulic fracturing is the enabling technology that currently allows the oil and gas industry to extract oil and gas from a tight, low-permeability rock formation such as shale. In hydraulic fracturing, a fluid is provided under pressure to a subsurface formation such as shale to create fractures in the formation thereby releasing hydrocarbon gases or liquids from the formation. However, even with the best available technology, only a small percentage of the hydrocarbons present in the formation actually become available for extraction through hydraulic fracturing. Accordingly, even a small improvement in hydraulic fracturing efficiency will allow for a vastly larger volume of hydrocarbons from tight rock formations to be produced.

SUMMARY

A method for producing factures in a formation to release hydrocarbons (such as a hydrocarbon gas or liquid) from the formation is disclosed. In some embodiments, the method comprises reducing the in-situ temperature at a location in a formation having a first temperature by contacting the location with a first fluid and contacting the location with a fracturing fluid that is different than the first fluid to produce fractures in the formation while the location is at a second temperature below the first temperature to release hydrocarbons from the formation. The method can further include substantially removing the first fluid from the location prior to the contacting step. In some embodiments, after contacting the location with a fracturing fluid, the reducing and contacting steps are repeated. In some embodiments, the fracturing fluid is provided at a temperature below the second temperature. In some embodiments, the fracturing fluid produces an endothermic process at the location, such as those described herein.

In some embodiments, the first fluid can be provided to the location at a temperature below the in-situ temperature. For example, the first fluid can be selected from the group consisting of water, liquid nitrogen, a liquid inert gas, and liquid $CO_2$. In some embodiments, the method further comprises performing an endothermic process to produce a first fluid at a temperature below the in-situ temperature prior to providing the first fluid to the location. For example, water can be mixed with a dry salt, wherein the mixing of the water and the dry salt produces the endothermic process. The dry salt can be selected from the group consisting of ammonium chloride, sodium thiosulfate, ammonium nitrate, potassium chloride, sodium chloride, or mixtures thereof. Alternatively, a solution or dispersion of a first reactant (such an aqueous solution or dispersion) can be mixed with a solution or dispersion of a second reactant (such an aqueous solution or dispersion) to produce the first fluid, wherein the first reactant and the second reactant react to produce an endothermic reaction. In yet another alternative, two fluids can be mixed to produce endothermic mixing. In some embodiments, the method comprises providing the first fluid to the location at a temperature 25° C. to 250° C. or 25° C. to 175° C. below the in-situ temperature of the location. The first fluid can be contacted with the location for a time between 3 and 24 hours.

In some embodiments, at least a portion of the temperature reduction in the reducing step is caused by providing an endothermic process, such as an endothermic reaction or endothermic mixing, at the location. The method can include feeding a second fluid to the location and mixing the first fluid and the second fluid at the location to produce the endothermic process. For example, a first reactant can be provided in the first fluid, a second reactant can be provided in the second fluid, and the first fluid and the second fluid can mix at the location to produce an endothermic reaction. In some embodiments, one or both of the first fluid and the second fluid can be fed to the location at a temperature below the in-situ temperature of the location. The first fluid and the second fluid can be substantially removed prior to contacting the location with a fracturing fluid or a spacer fluid can be provided to the location, and the steps of feeding the first fluid to the location and feeding the second fluid to the location can be repeated.

In some examples of endothermic processes, the first fluid comprises an aqueous citric acid or an aqueous acetic acid solution and the second fluid comprises an aqueous sodium carbonate or an aqueous sodium bicarbonate solution. In some examples, the first fluid comprises an aqueous barium hydroxide octahydrate solution and the second fluid comprises an aqueous ammonium chloride solution. In some examples, the first fluid comprises an aqueous cobalt (II) sulfate heptahydrate solution and the second fluid comprises an aqueous thionyl chloride solution. In some examples, endothermic mixing is used and the first fluid is water and the second fluid comprises ethanol, erythritol or xylitol.

In some embodiments, the first temperature is reduced by feeding the first fluid to the location by at least 25° C. or at least 50° C. In some embodiments, the temperature reduction described herein does not result in freezing the first fluid at the location.

In some embodiments, a method for producing fractures in a formation to release hydrocarbons from the location, comprises reducing the in-situ temperature at a location in a formation having a first temperature by contacting the location with a first fluid, wherein the first fluid produces an endothermic reaction at the location to reduce the in-situ temperature at the location; and producing fractures in the formation while the location is at a second temperature below the first temperature to release hydrocarbons from the formation. In some embodiments, the first fluid produces fractures in the formation. In some embodiments, the fractures are produced in the formation by contacting the location with a fracturing fluid. The endothermic reaction can be provided as described herein.

In some embodiments, a method for producing fractures in a formation to release hydrocarbons from the formation, comprises performing an endothermic process to produce a first fluid at a temperature below the in-situ temperature at a location in a formation, reducing the in-situ temperature at the location by contacting the location with the first fluid, and producing fractures in the formation while the location is at a second temperature below the first temperature to release hydrocarbons from the formation. In some embodiments, the first fluid produces fractures in the formation. In some embodiments, the producing step comprises contacting the location with a fracturing fluid to produce fractures in the formation.

By lowering the temperature at the location in the formation, it has been discovered the in-situ formation stress is lowered, which in turn lowers the threshold for hydraulic fracturing. As a result, at the same pump hydraulic horsepower (pressure) and the same volumes and rates of the fracturing fluid, much larger and more extensive fracture networks can be created at the location that has been cooled. This results in the ability to extract a larger amount of hydrocarbons from the formation. Alternatively, either pump hydraulic horsepower and/or the volumes and rates of the fracturing fluid pumped can be reduced to produce comparable fracture networks at the location that has been cooled.

The details of one or more embodiments are set forth in the descriptions below. Other features, objects, and advantages will be apparent from the description and from the claims.

DETAILED DESCRIPTION

Hydraulic fracturing is a process that creates fractures in rock formations, such as coal beds, tight sands and carbonates, and shale, which has the effect of increasing the output of a well. The most important industrial use of this process is for stimulating oil and gas wells to enhance oil and natural gas recovery.

Hydraulic fracturing helps remove hydrocarbon gases and liquids (oil and condensates) from rock formations deep within the earth's crust where there are insufficient porosity and permeability levels to allow these resources to flow from the formation to the wellbore at economic rates. The fractures provide a conduit or path that connects the formation to the well, thereby increasing the area from which the hydrocarbons can be recovered.

Hydraulic fractures are typically extended by creating internal fluid pressure into the formations which opens the fractures and causes them to extend through the formations. The fracture width is typically maintained by introducing a proppant, such as sand, ceramic, or other particulates, wherein the imposition of the proppant into the openings helps to prevent the fractures from closing when the injection is stopped.

The applicants have discovered that by reducing the temperature at a location in the formation, the in-situ formation stress is lowered, which in turn lowers the threshold for hydraulic fracturing. As a result, larger and more extensive fracture networks can be created at the location that has been cooled, thereby resulting in the ability to extract a larger amount of hydrocarbons from the formation.

In some embodiments, the method comprises reducing the in-situ temperature at a location in a subterranean formation, particularly in a wellbore, having a first temperature by contacting the location with a first "cooling" fluid. The cooling fluid can reduce the in-situ temperature at the location by being provided at a temperature below the in-situ temperature of the location, by producing an endothermic process at the location, or both. The cooling fluid can be in the form of a liquid or a liquefied gas.

In some embodiments, the cooling fluid is provided at a temperature below the in-situ temperature of the location in the formation. The formation can often have temperatures varying from 50-250° C. and the cooling fluid is provided at a temperature below that temperature to cool the formation at the location where the cooling fluid is provided. The cooling fluid can be selected from the group consisting of water, liquid nitrogen, a liquid inert gas (e.g., liquefied argon or helium), and liquid $CO_2$. In some embodiments, the cooling fluid comprises water at a temperature below the in-situ temperature of the location in the formation.

In some embodiments, at least a portion of the temperature reduction in the reducing step is caused by providing an endothermic process, such as an endothermic reaction or endothermic mixing. The endothermic process is a process driven by an increase in entropy that requires heat as input, and thus exerts a strong cooling effect while it extracts heat from the surrounding environment. In some embodiments, the endothermic process occurs at the location. While the cooling fluid undergoes the endothermic process at the location, heat is extracted from the formation at the location, thus lowering the in-situ temperature at the location. Alternatively, the endothermic reaction or mixing processes described herein can be conducted at a location remote from the location in the formation, e.g., at the surface or in the well, and the resulting cooling fluid can be fed to the location in the formation to reduce the in-situ temperature at the location. In some embodiments, a first cooling fluid is fed to the location, a second fluid is fed to the location, and the first fluid and the second fluid are mixed at the location to produce the endothermic process at the location.

In some embodiments, a first reactant can be provided in the first fluid, a second reactant can be provided in the second fluid, and the first fluid and the second fluid can mix at the location to produce an endothermic reaction, e.g., by the reaction of the first reactant and the second reactant. For example, the first fluid can be a solution or dispersion of a first reactant (e.g., an aqueous solution or dispersion) and the second fluid can be a solution or dispersion of a second reactant (e.g., an aqueous solution or dispersion). In some examples, the first reactant can be citric acid and/or acetic acid and the second reactant can be sodium carbonate and/or sodium bicarbonate. In some examples, the first reactant comprises barium hydroxide octahydrate and the second reactant comprises ammonium chloride. In some examples, the first reactant comprises cobalt (II) sulfate heptahydrate and the second reactant comprises thionyl chloride. Other compounds can be chosen as the first reactant and the second reactant that react endothermically.

In some embodiments, a first fluid such as water can mix with a second fluid or with a dry salt to produce endothermic mixing. In some examples, the first fluid is water and the second fluid comprises ethanol, erythritol or xylitol. In some examples, the first fluid is water, and the water is mixed with the dry salt to produce the endothermic process. Typically, the water is mixed with a dry salt at a location remote from the location in the formation. The dry salt can be selected from the group consisting of ammonium chloride, sodium thiosulfate, ammonium nitrate, potassium chloride, sodium chloride, or mixtures thereof.

The cooling fluid (including the first cooling fluid and/or the second cooling fluid in the case of two cooling fluids) can be stored in an insulated vessel either within the well or outside of the well, such as at the surface. For example, the vessel can be refrigerated or the fluid can be cooled through the use of a mud cooler or by other means such as adiabatic expansion. Alternatively, the cooling fluid can be cooled to a temperature below the in-situ temperature through the use of an endothermic process (such as those described herein) and then provided to the location. The cooling fluid can be circulated adjacent the location by pumping or injecting the cooling fluid to the location. For example, the cooling fluid can be circulated adjacent the location in the formation from the surface and/or downhole by means of a tubing (e.g., a coiled tubing) or a drill pipe, to cool the location by convection. Any suitable mechanism for pumping the cooling fluid can be utilized, that allows the fluid to go into the formation such as those typically used in hydraulic fracturing. The cooling fluid can be circulated at pressures that are generally not sufficient to induce fractures in the formation. The cooling of the location in the formation can be provided through the presence of steel casing and cementation opposite the location in the formation, either before or after perforation of said casing and cementation.

The cooling fluid can be provided at any temperature below the in-situ temperature of the formation at the location. For example, the cooling fluid can be provided at a temperature of 400° C. or more, 350° C. or more, 300° C. or more, 250° C. or more, 225° C. or more, 200° C. or more, 190° C. or more, 180° C. or more, 170° C. or more, 160° C. or more, 150° C. or more, 140° C. or more, 130° C. or more, 120° C. or more, 110° C. or more, 100° C. or more, 90° C. or more, 80° C. or more, 70° C. or more, 60° C. or more, 50° C. or more, 40° C. or more, 30° C. or more, 25° C. or more, 20° C. or more, 15° C. or more, 10° C. or more, or 5° C. or more below the initial in-situ temperature at the location. In some embodiments, the method comprises providing the first fluid to the location at a temperature of 5° C. to 400° C., 10° C. to 300°, 15° C. to 250°, 20° C. to 200° C., 25° C. to 195° C., 35° C. to 185° C., or 50° C. to 175° C. below the in-situ temperature of the location. In some embodiments, the temperature reduction described herein does not result in freezing the first fluid at the location.

The cooling fluid can be contacted with the location for a time sufficient to cool the formation at the location. In some embodiments, the cooling fluid can be contacted with the location for at least 5 minutes, 15 minutes, 30 minutes, 1 hour, 2 hours, 3 hours, 4 hours, 5 hours, 6 hours, 8 hours, 10 hours, 12 hours, 15 hours, 18 hours, 24 hours, 1.5 days, 2 days, 2.5 days, 3 days, 4 days, 5 days, 6 days, or a week. For example, the cooling fluid can be contacted with the location for between 3 and 24 hours. The longer the period of time the cooling fluid is contacted with the location, the greater the decrease of the temperature at the location. In addition, a temperature decrease will occur in the formation in locations adjacent those in contact with the cooling fluid and the cooling will propagate through the formation more at longer exposure times to the cooling liquid resulting in greater propagation of the temperature reduction.

The cooling fluid can be contacted with the location for a time sufficient to cool the formation at the location by at least 1° C. In some embodiments, the in-situ temperature is reduced by at least 2° C., at least 3° C., at least 5° C., at least 7° C., at least 10° C., at least 15° C., at least 20° C., at least 25° C., at least 30° C., at least 35° C., at least 40° C., at least 45° C., at least 50° C., at least 55° C., at least 60° C., at least 65° C., at least 70° C., at least 75° C., at least 80° C., at least 85° C., at least 90° C., at least 95° C., or at least 100° C.

In some embodiments, after the temperature at the location in the formation has been reduced, the cooling fluid can be substantially removed (pumped) from the location. Alternatively, a spacer fluid such as water can be provided to the location to substantially displace the cooling fluid. For example, these steps can remove or displace 75% or more, 80% or more, 85% or more, 90% or more, or 95% or more of the cooling fluid. The removal or displacement of the cooling fluid can be followed by one or more additional steps of contacting the location with a cooling fluid. The cooling fluid can also be continuously circulated to the location to reduce the temperature at the location.

While the location is at a second temperature below the initial in-situ temperature, the location can be contacted with a fracturing fluid to produce fractures in the formation to release hydrocarbons from the formation. The fracturing fluid is provided at a pressure sufficient to produce fractures in the rock. For example, the fracturing fluid can be provided to the location at a pressure of from 1000 psi to 35,000 psi. The fracturing fluid can be provided to the formation using the same mechanism used to deliver the cooling fluid. In some embodiments, the fracturing fluid can be a fluid that is different than the fluid used as the cooling fluid. For example, the fracturing fluid can be provided in the form of a gel produced by crosslinking a biopolymer with borax in water. Alternatively, the fracturing fluid can be in the form of a liquid such as water and can optionally include chemical additives (generally in an amount of from 0.5 to 2.0 percent) or can include a hydrocarbon base (such as diesel fuel). The fracturing fluid can also include proppants, which are very small, very hard, and preferably spherical particles, to maintain the fractures that are produced in the fracturing step. In some embodiments, the fracturing fluid can be a different fluid than the cooling fluid and the fracturing fluid can produce an endothermic process at the location. In some embodiments, the fracturing fluid can be the same as the cooling fluid. For example, the cooling fluid that produces an endothermic process at the location can also be used as the fracturing fluid and cooling and fracturing accomplished in a single step. In some embodiments, the fracturing fluid is provided at a temperature below the second temperature.

When the fracturing fluid pressure is relieved, the fracturing fluid flows out of the formation, but the proppants remain in the widened or newly-formed cracks and fissures, forming a filler material of comparatively high permeability that is strong enough to withstand geologic pressures so as to prop the cracks and fissures open. Once the fracturing fluid has drained away, liquid and/or gaseous hydrocarbons can migrate through the spaces between the proppant particles and into the wellbore, from which they may be recovered using known techniques.

In one example, the formation can be provided at a in-situ temperature of 200° C., a location in the formation can be contacted with the cooling fluid (e.g., water) at 10° C. for a sufficient period to decrease the temperature at the location to 150° C., and the location can be contacted with a fracturing fluid while the temperature at the location is below 200° C. (e.g., 160° C.). Alternatively, an endothermic process can be used to reduce the temperature at the location to 150° C. prior to contacting the location with the fracturing fluid.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A method for producing fractures in a formation to release hydrocarbons from the formation, comprising:
   reducing the in-situ temperature at a location in a formation by contacting the location with a first fluid, the location having an initial in-situ temperature; and
   contacting the location with a fracturing fluid to produce fractures in the formation to thereby release hydrocarbons from the formation,
   wherein the fractures are produced in the formation by contacting the location with the fracturing fluid while the location is at a second temperature below the initial in-situ temperature, and
   wherein the fracturing fluid is different than the first fluid.

2. The method of claim 1, further comprising the step of substantially removing the first fluid from the location prior to said contacting step.

3. The method of claim 1, wherein said reducing step comprises providing the first fluid to the location at a temperature below the initial in-situ temperature.

4. The method of claim 3, wherein the first fluid is selected from the group consisting of water, liquid nitrogen, a liquid inert gas, and liquid $CO_2$.

5. The method of claim 4, wherein the first fluid is water.

6. The method of claim 3, further comprising performing an endothermic process to produce a first fluid at a temperature below the initial in-situ temperature prior to providing the first fluid to the location.

7. The method of claim 1, comprising providing the first fluid to the location at a temperature 25° C. to 250° C. below the initial in-situ temperature of the location.

8. The method of claim 1, wherein the first fluid is fed to the location for a time between 3 and 24 hours.

9. The method of claim 1, wherein at least a portion of the temperature reduction in the reducing step is caused by providing an endothermic process at the location.

10. The method of claim 9, wherein the reducing step comprises:
    feeding a second fluid to the location, and
    mixing the first fluid and the second fluid at the location to produce the endothermic process.

11. The method of claim 10, wherein the reducing step comprises:
    providing a first reactant in the first fluid; and
    providing a second reactant in the second fluid,
    wherein the first reactant and the second reactant react to produce an endothermic reaction.

12. The method of claim 10, comprising providing the first fluid and the second fluid to the location at a temperature below the initial in-situ temperature of the location.

13. The method of claim 10, further comprising the step of substantially removing the first fluid and the second fluid prior to said contacting step.

14. The method of claim 1, wherein the initial in-situ temperature is reduced by at least 25° C.

15. The method of claim 1, wherein the first fluid does not freeze at the location.

16. The method of claim 1, wherein the fracturing fluid is provided at a temperature below the second temperature.

* * * * *